United States Patent [19]

Hood, Jr. et al.

[11] Patent Number: 4,497,265
[45] Date of Patent: Feb. 5, 1985

[54] SEEDING IMPLEMENT

[75] Inventors: Clarence E. Hood, Jr., Clemson; Thomas R. Garrett, Six Mile; Charles R. DuBose, Central, all of S.C.

[73] Assignee: Clemson University, Clemson, S.C.

[21] Appl. No.: 481,789

[22] Filed: Apr. 4, 1983

[51] Int. Cl.³ .............................................. A01C 7/16
[52] U.S. Cl. ..................................... 111/86; 221/274; 221/286
[58] Field of Search ................................. 111/1, 8–14, 111/34, 63–65, 73–77, 85, 86; 221/200, 268, 272–275; 222/200, 275–277, 314, 359, 361, 409, 411, 459, 238, 247

[56] References Cited

U.S. PATENT DOCUMENTS

| | | | |
|---|---|---|---|
| 13,151 | 6/1855 | Stoddard | 111/94 |
| 20,547 | 6/1858 | Burnside | 111/89 |
| 91,143 | 6/1869 | Matthews | 111/DIG. 1 |
| 117,361 | 7/1871 | Baer | 111/13 |
| 146,422 | 1/1874 | Barton | 111/77 |
| 173,495 | 2/1876 | Randolph | 111/95 |
| 245,045 | 2/1881 | Baker | 111/10 |
| 431,647 | 7/1890 | Busch | 111/89 |
| 431,841 | 7/1890 | Davis | 111/95 |
| 479,998 | 8/1892 | Summers | 111/1 |
| 594,091 | 11/1897 | Matteson | 111/10 |
| 1,287,930 | 2/1918 | Evans | 111/DIG. 1 |
| 2,334,376 | 11/1943 | Bauer | 275/8 |
| 2,628,000 | 2/1953 | MacKenzie | 222/162 |
| 2,857,864 | 10/1958 | Cromer | 111/95 |
| 2,947,450 | 8/1960 | Wilson | 222/136 |
| 3,155,293 | 11/1964 | Cotter | 222/478 |
| 3,355,070 | 11/1967 | Dethmers | 111/34 |
| 3,815,527 | 6/1974 | Dobbins | 111/11 |
| 3,927,400 | 12/1975 | Knepler | 340/276 |

Primary Examiner—James R. Feyrer
Attorney, Agent, or Firm—Wellington M. Manning, Jr.

[57] ABSTRACT

A seeding implement which includes a cylindrical container having a bottom with a centrally located opening therein. A metering plate is located beneath said container, preferably defining a plurality of different sized orifices that are locatable beneath and concentric to the bottom wall opening of the container. An elongated, adjustable seed metering rod is provided which includes a flattened tip that resides within said bottom wall opening, and eccentric thereto, and with the rod being mounted for oscillatory motion. Removable mounting of a plurality of seeding implements on a soil renovating implement is also disclosed and claimed.

20 Claims, 3 Drawing Figures

SEEDING IMPLEMENT

BACKGROUND OF THE INVENTION

The present invention relates to improved apparatus for the controlled dispensing of seeds in an agricultural environment such as the interseeding of a pasture containing fescue and bermuda or the like.

Numerous devices have been developed heretofore for the application of seed from a hopper or other container. Such devices operate to attempt to dispense seed in a controlled pattern, to deposit the seed in a particular location, to deposit only a predetermined quantity of seed, or the like. Improved seeding operations can result over manual broadcast of seed or manual deposition of seed into a furrow. Furthermore, such seeding implements have heretofore been employed in conjunction with various types of soil tilling equipment with the equipment being towed by a tractor or other motive power source. Operations have thus been more efficiently and more effectively conducted to deposit a quantity of seed in a particular location. All of the above noted devices have been desirable from the standpoint of economy and efficiency.

Exemplary of the types of prior art seeding devices mentioned above are those disclosed in the below listed U.S. Pat. Nos.: 13,151, 2,628,000, 20,547, 2,857,864, 173,495, 2,947,450, 431,647, 3,155,293, 431,841, 3,815,527, 479,998, 3,927,400, 2,334,376.

In addition to the devices disclosed in the above listed patents, a particular combined implement has been known in which a seeder implement is combined with a renovator, the combined implements being equipped with a three-way hitch for operative association with a tractor. The renovator includes a plurality of spaced apart renovator shanks having a toe plate that digs furrows into the soil, ripping the sod and root mass along lines determined by location of the shanks. The seeder is secured behind the shanked renovator and includes a single hopper having diamond-shaped openings across the bottom of the hopper. The diamond-shaped openings may be varied in size by means of an adjustment gauge whereby the dispensing opening may be adapted for a particular type seen and/or a particular quantity of seed per acre to be dispensed. The seeder is further supported by wheels that follow the terrain and also turn a horizontally disposed, ribbed agitator rod that extends along the inside of the hopper, stirring seed to permit dispensing without bridging.

With the devices of the prior art noted above, certain problems continue to exist, both insofar as particular placement of the seed and in controlling the quantity of seed being dispensed. By way of example, in upgrading pasture land, it is a common practice to periodically renovate the pasture and to interseed clover among existing fescue, coastal Bermuda or the like. A significant quantity of nitrogen per acre may be added by the clover while at the same time producing high quality forage for consumption by animals feeding on the pasture. Particularly, a good stand of clover can add up to about 200 pounds of nitrogen per acre each year when interseeded across a pasture at rates as low as 2 pounds of clover seed per acre of pasture. Clover seeds are both quite small and quite expensive. Due to the very small size of the clover seed, it is difficult to meter same accurately during the seeding process such that rates as low as two pounds can be deposited across an acre of land. Though the combination renovator-seeder alluded to above is stated to have the capability of controlled deposition of seeds and/or fertilizer from $2\frac{1}{2}$ pounds per acre to 100 pounds per acre, the present invention represents definite improvement over same. Particularly, though certain advantages will become apparent from the following description of the invention, the present invention affords the capability of very accurate metering of the quantity of seed being deposited, permits the deposition of the seed at a precise location, enables the operator to at all times remain cognizant of proper feeding conditions, permits the interseeding of a plurality of types of seeds from adjacent hoppers, and the like. Moveover, the present invention is neither taught nor suggested by the prior art, including that referred to above.

SUMMARY OF THE INVENTION

It is an object of the present invention to provide an improved implement for the metered application of seeds during a seeding operation.

Another object of the present invention is to provide an improved implement for the metering of predetermined quantities of seeds from separately controlled, side-by-side containers and the placement of seeds from each container at a particular location.

Yet another object of the present invention is to provide an improved seeding implement in combination with soil tilling equipment to permit interseeding of pasture or other land with very small, controlled quantities of seed, and deposition of the seed at predetermined locations only.

Still further another object of the present invention is to provide an improved renovator-seeder implement that is economical in nature, while being adjustable to permit the dispensing of predetermined quantities of seed only over a wide range of feed rates and which implement enables the operator of the transport device to remain constantly aware of proper operation of the device.

Generally speaking, the improved seeder implement according to teachings of the present invention comprises a container for seed to be metered onto the ground, said container including a bottom wall that defines an opening therein; metering means located adjacent said bottom wall of said container, said metering means defining at least one orifice therein, said orifice being smaller than said opening in said bottom wall and cooperating with same to define a dispensing outlet for seed from said container; and positive feed means received in said bottom wall opening along an axis eccentric to a central axis through said orifice in said metering means, said feed means being adapted for arcuate motion about its axis whereby during said arcuate motion of said feed means, seed are metered through said orifice.

More specifically, the seeder implement according to teachings of the present invention includes a seed container that is preferably cylindrical in nature and which includes a sloped bottom wall having an opening generally centrally thereof through which seeds to be dispensed may pass. The container is further provided with a generally rectangular shaped base that defines a slide way along a central portion of same located beneath the bottom wall opening. A metering plate is receivable in the slide way and defines a plurality of different sized orifices therealong, each orifice being so positioned that same can be located beneath the opening of the bottom wall of the container, concentric thereto. An elongated rod extends through the top of the container down into the opening in the bottom wall and has a flattened tip. The rod is located eccentric to the bottom wall opening and has a diameter of approximately one-half the diameter of the opening, such that when located centrally of the radius of the bottom wall opening, during oscillating motion, the flattened tip of the rod moves about an arc that passes through a center line of the opening and an orifice positioned thereunder to positively feed seed from the container through the orifice.

Preferably, the seeding implement of the present invention is mounted on a soil tilling implement, such that the seed may be metered from the container and deposited onto the soil at a predetermined location. For example, a renovator may be utilized which includes a frame to which a plurality of spaced apart shanks are secured, each shank having a toe plate of a particular design secured at an end of same, and which penetrates the soil and produces furrows therealong. Individual seeding implements may thus be located on the renovator frame in line with individual shanks such that seed being metered therefrom may be directly deposited into the furrows produced by the shank toe plates. Appropriate structural frame work may be provided on the renovator to receive the rectangular base of the seeding implements, with further means to secure the implement thereto. In a preferred arrangement, an elastic member is secured to the frame at one side of the location for each seeding implement, passes over the top of the implement and is removably securable to the frame at an opposite side. The elastic member includes an opening along a medial portion of same through which the oscillatable feed rod may pass. With individual seeding units spaced along the length of a renovator, the individual rods of same may be associated with a common drive means. All of the rods may thus be simultaneously oscillated during operation of the renovator-seeder implement.

Each of the feed or metering rods preferably passes through a support member that is laterally adjustable to properly locate the rod with respect to the bottom wall opening of the particular container with which it is associated. Each rod is also preferably threaded at an upper end where it makes threaded connection with a portion of its mounting means such that vertical adjustment of the rod may likewise be achieved with respect to its respective bottom wall opening. Vertical position of the flat tip of the rod may determine the amount of seed to be metered.

With a plurality of individual seeding units spaced along the width of a renovator or other tilling implement, and utilizing transparent containers, different types of seed may be sewn at the same or different precise rates during a single pass of the implement. At the same time, the operator of the tractor or other motive power source may visually determine the presence of seed in each container as well as proper operation of the individual seeding units. While in general seed will not be dispensed from the individual units when the feed rod is not oscillating, obviously, vibration during transport of the implement, may cause seed to fall from the container. A closure member is thus preferably located beneath the individual unit dispensing outlets with means available to the tractor operator to open and close the dispensing outlets as desired.

DESCRIPTION OF THE PREFERRED EMBODIMENTS

Figure 1:
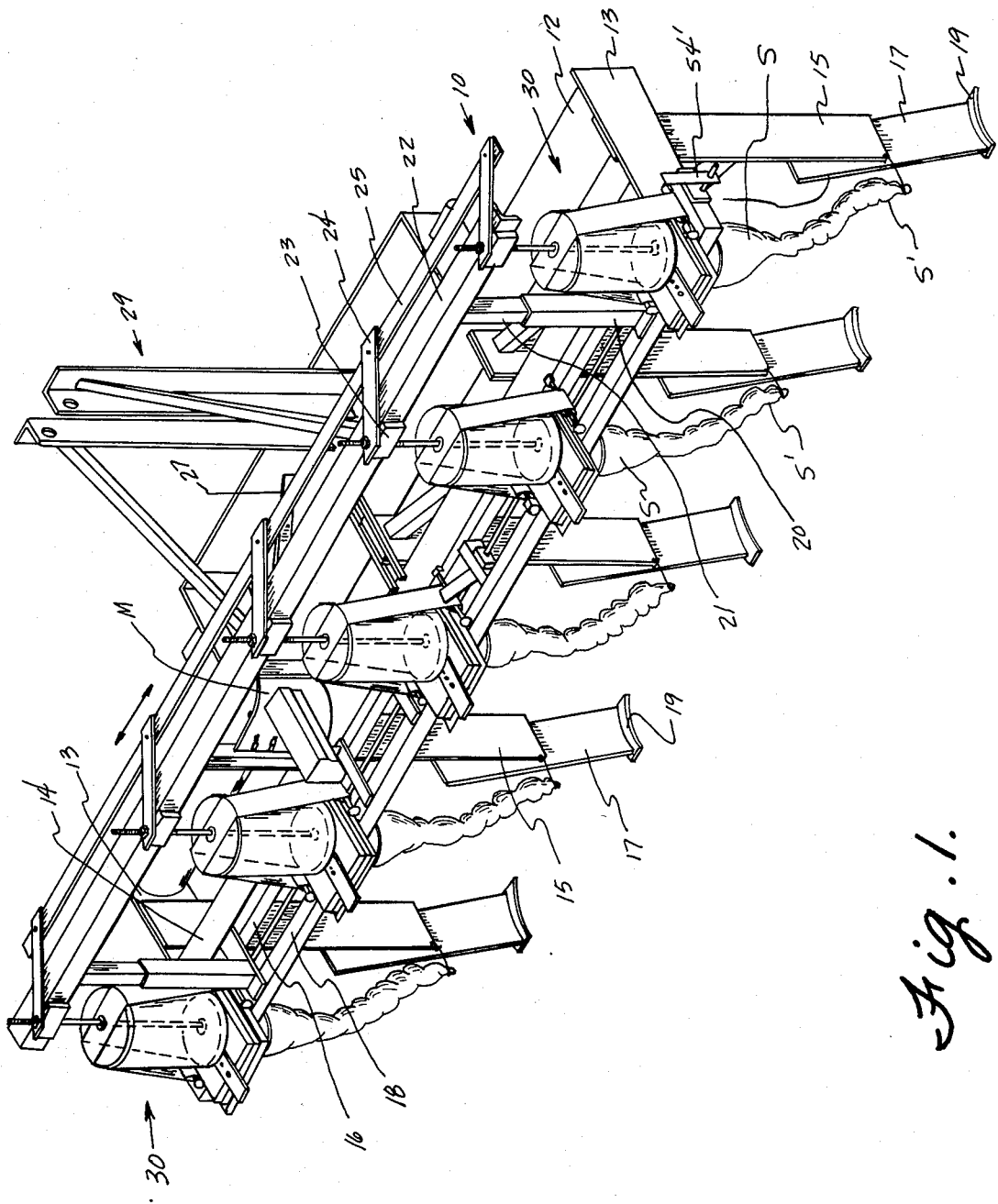
FIG. 1 is an isometric view of a plurality of seeding implements according to teachings of the present invention mounted on a soil renovator implement.

Making reference to the Figures, preferred embodiments of the present invention will now be described in detail. FIG. 1 illustrates a most preferred embodiment of the present invention which includes a conventional soil renovator generally indicated as 10 and having a standard three point hitch generally indicated as 29 secured thereto. Renovator 10 includes frame defined by a plurality of transverse struts 12, 14, 16 and 18 that extend across the width of the implement and which are united by a plurality of longitudinally extending plates 13. A plurality of spaced apart arms 15 are secured to the frame between struts 12 and 14 and extend downwardly therefrom. Secured to the lower free end of arms 15 are shanks 17 which have toe plates 19 secured thereto. During operation, the toe plates 19 will penetrate the soil as the implement is moved along a pasture, field or the like and produce furrows therealong.

Struts 16 and 18 that provide a portion of the frame of renovator 10 are superfluous insofar as the renovator, per se, is concerned. Struts 16 and 18 are located in spaced apart relationship rearwardly of struts 12 and 14 to receive a plurality of seeding units or implements generally 30 thereon, in general axial alignment with shanks 17, such that seed being metered from seed implements 30 is deposited into the furrows produced by toe plates 19 as the implement is moved across the area being renovated. Preferably a sleeve S is secured beneath each seeder unit 30 with a lower end S' of same secured to arms 15. Seed metered from units 30 thus falls from lower end S' of sleeve S immediately into the furrows being produced.

Making reference to FIGS. 2 and 3, the preferred embodiment of the seeding implement 30 will be described. A seed container 31, which is preferably cylindrical in shape, and preferably transparent in nature, is provided with a bottom wall 32 having a centrally located opening 33 defined therein. Bottom wall 32 tapers from its outer edges inwardly towards opening 33 to foster seed movement. A removable cover plate 34 is provided atop container 31 and defines an opening 35, the purpose of which will be described hereinafter and an opening 36 through which seed may be admitted into container 31.

Each container 31 of seeding implement 30 is provided at its lower end with a rectangular base that is defined by plates 40 and 41, which are receivable atop mating edges of rectangular frame elements 16 and 18. Plates 40 and 41 define a slide way 42 along a central portion of same with openings 43 and 44 defined in a bottom of the slide way. Opening 44 is concentric to bottom wall opening 33 of container 31, such that seed being metered will pass therethrough. The purpose of opening 43 will be defined hereinafter. A pair of brackets 45 are secured to frame elements 16 and 18 at one side of each location at which a seeding implement 30 is to be received and receive a rod 46 therethrough. An extensible material, preferably rubber, is secured about rod 46 and defines an opening 48 generally centrally thereof. An opposite end of extensible material 47 is provided with a further rod 49 which is removably receivable under a pair of brackets 50 that are secured to frame elements 16 and 18 at an opposite side of each location for a seeding unit 30. Accordingly, when material 47 is passed around an upper portion of a seeding unit 30, same may be extended to place rod 49 under brackets 50 and thereby removably secure seed unit 30 to the frame. Opening 48, as will be further discussed hereinafter is provided to permit metering rod 60 to pass therethrough. Utilization of extensible material 47 thus permits each of the individual seeding units 30 to be easily removable from the renovator implement for cleaning, repair, replacement with a larger container, or the like.

A metering plate 51 is received beneath container 31, within slide way 42 and has a plurality of different sized orifices 52 spaced therealong, each of the different sized orifices being so located along metering plate 51 that each can be positioned immediately below and concentric to bottom wall opening 33 of container 31. With metering plate 51 residing in slide way 42 and a particular sized orifice 52 located beneath bottom wall opening 33, a locking pin 53 may be passed through one of the non-used orifices 52 that is located above opening 43 in slide way 42, and through opening 43 to lock the plate 51 in place. With metering plate 51 properly positioned, seed within container 31 may then pass through bottom wall opening 33, orifice 52, and opening 44 in slide way 42 to be deposited onto the ground at a particular location. The particular sized orifice 52 that is located concentric to and beneath bottom wall opening thus limits the rate at which seed may be metered. As shown in FIG. 1, a sleeve S may be secured beneath each seeding unit 30 with the lower free end of same secured to shank arm 15 such that seed falling therethrough will drop immediately into a furrow being produced by toe plate 19.

As mentioned hereinbefore, during transit or otherwise, it is not desirable for seed to fall from seed unit 30 when a seeding operation is not being performed. Rod 54 mounted for pivotal movement between frame elements 16 and 18 has a closure plate 55 secured thereto in alignment with slide plate opening 44 of each seed unit 30. Pivotal movement of rod 54 will thus move closure plates 55 against or away from base plate 40 to close or open the seed dispensing outlet. As illustrated in FIG. 1, rod 54 extends across the width of the renovator implement with an activator rod 54' secured at an end of same. An elongated cord 54" or the like may be secured to activator rod 54' with an opposite end of same located at the tractor seat, operations console or the like. When desired, the operator may pull on cord 54", to effect pivotal movement to rod 54 to close each of the dispensing outlets of seed units 30. Rod 54 is preferably spring loaded to normally hold plates 55 away from opening 44, which dictates that the operator secure cord 54" after cord 54" is pulled to close openings 44. Thereafter, once cord 54" is released, rod 54 is biased to return plates 55 to the open position as shown in FIG. 2.

Figure 2:
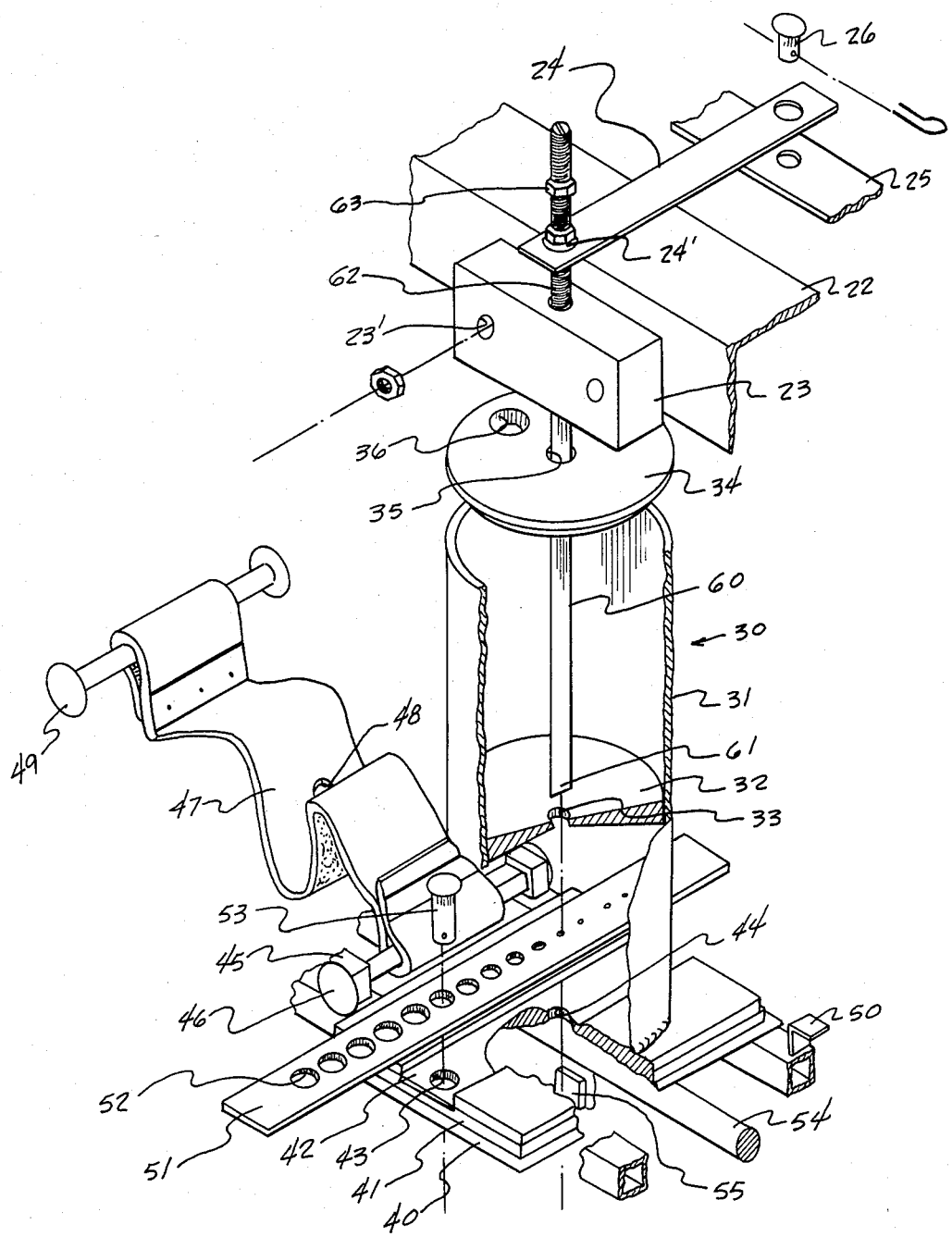
FIG. 2 is an isometric view of a seeding implement according to teachings of the present invention, in partial cross section, and partially exploded, illustrating the various components of same.
Figure 3:
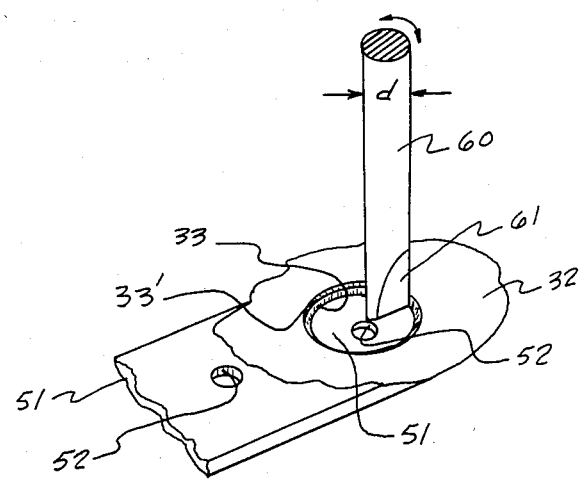
FIG. 3 is a partial view of a seeding implement according to teachings of the present invention illustrating in detail the relationships of the oscillating rod with respect to the seed dispensing outlet assembly.

As particularly illustrated in FIGS. 2 and 3, each seed unit 30 is equipped with a metering rod 60 which extends generally along the height of same and has a flattened tip 61 that resides within opening 33 of container bottom wall 32. Metering rod 60, at an opposite end, extends through opening 35 of container cover 34, opening 48 of extensible material 47, a transversely adjustable mounting block 23 and a drive connector rod 24. An upper end 62 of metering rod 60 is threaded, for securement to a nut 24' that is welded to drive connector 24. Rod 60 may therefore be adjusted vertically with respect to bottom wall opening 33 of container 31. Likewise with lateral adjustment of mounting block 23, rod 60 and container 30 may be moved laterally along frame elements 16 and 18 to ensure concentricity between bottom wall opening 33 and slide way opening 44, and eccentricity between rod 60 and opening 33. As illustrated in FIG. 3, with metering plate 51 received beneath bottom wall 32 of container 31 and with bottom wall opening 33 and orifice 52 concentrically located, flattened tip 61 of metering rod 60 is eccentrically located within opening 33 adjacent plate 51. The diameter d of rod 60 is approximately half the diameter of bottom wall opening 33 and rod 60 is preferably located centrally of the radius of bottom wall opening 33, such that when rod 60 oscillates as shown by the arrows, tip 61 of same passes through the center line of opening 33 and thus orifice 52, causing seed located around rod 60 to be dispensed through orifice 52, after which the seed falls through slide way opening 44 and sleeve S into the particular furrow, or as otherwise desired.

While obviously any suitable drive means may be utilized to impart oscillatory motion to rod 60, a preferred arrangement according to the present invention where a plurality of seeding units 30 are disposed in spaced apart, side by side relationship includes the use of a single direct current drive motor M (See FIG. 1) that is eccentricly connected in a conventional manner (not shown) to a drive arm 27 causing drive arm 27 to move backwards and forward with respect to motor M. An outer end of drive arm 27 is pivotally associated with connector rod 25 that extends across the width of implement 10 with the individual drive connector elements 24 for each seeding unit 30 pivotally secured thereto, whereby during operation of motor M, the drive assembly moves in an oscillating motion according to the two headed arrow shown on FIG. 1. With metering rods 60 threadedly secured to drive connector elements 24, rods 60 are likewise oscillated.

Having described the preferred embodiments of the present invention, general operation of an implement utilizing same will now be described. With the renovator implement 10 as illustrated in FIG. 1 secured to a tractor via three point hitch 29, and with a seeding unit 30 located behind each shank 17, seeds may be deposited into the furrows produced by toe plates 19. An opening 36 is provided in top cover 34 of container 31 such that seed may be replenished without removal of the seeding units 30. Instead cover plate 34 is rotated such that opening 36 is exposed from beneath extensible member 47. With appropriate seed in container 31, as the renovator implement moves across a pasture to be seeded, for example, and with the drive motor M operational, rod 60 oscillates within bottom wall opening 33, and adjacent metering plate 51, directing a predetermined quantity of seed through bottom wall opening 33 and the particular orifice 52 disposed therebeneath into sleeve S and from sleeve S directly into the furrow. The quantity of seed to be dispensed may be varied by location of a particular size orifice beneath bottom wall opening 33 of container 31. Additionally, the quantity of seed being dispensed may also be varied by the speed of oscillation of rod 60 and by vertical placement of tip 61 of rod 60. For example, as rod 60 is adjusted upwardly away from metering plate 51, an increased seed flow results.

With the arrangement described above, where individual seeding units 30 are provided across the width of a particular agricultural implement, a number of advantages are inherent. Transparency of container 31 permits the tractor operator to visually determine that an adequate quantity of seed is present within container 31, and that each seed unit 30 is functioning properly. Secondly, since a plurality of individually adjustable seeding units 30 are deployed across renovator 10, each may be individually adjusted whereby different types of seeds may be employed across renovator 10, being sown at the same or different rates. Thirdly, removability of the individual seed units 30 permits retention of unused seed and ease of maintenance and cleaning of the units. Likewise since individual units are employed, with the seed being sown only at the desired locations where the soil has been prepared, seed conservation is achieved with a significantly improved germination rate for the seed that are sown.

Having described the present invention in detail, it is obvious that one skilled in the art will be able to make variations and modifications thereto without departing from the scope of the invention. Accordingly, the scope of the present invention should be determined only by the claims appended hereto.

That which is claimed is:

1. An improved agricultural seeder implement comprising:
   (a) a container for seed to be metered onto the ground, said container including a bottom wall that defines an opening therein;
   (b) metering means located adjacent said bottom wall of said container, said metering means defining at least one orifice therein, said orifice being smaller than said opening in said bottom wall and concentric with respect thereto, said opening and said orifice cooperating to define a dispensing outlet for seed from said container; and
   (c) positive feed means received in said bottom wall opening and along an axis eccentric to a central axis through said orifice in said metering means, said feed means being adapted for arcuate motion about its axis whereby during said arcuate motion of said feed means, seed are positively metered through said orifice.

2. An implement as defined in claim 1 wherein said container is transparent and further includes a top wall defining a seed filling opening therein.

3. An implement as defined in claim 1 wherein said metering means is a plate, said plate defining a plurality of differently sized orifices therein, said plate being moveable to position a predetermined orifice under said bottom wall opening.

4. An implement as defined in claim 1 wherein said positive feed means comprises an elongated rod, said rod having a flattened tip portion that is located in said bottom wall opening, and further comprising drive means associated with said rod for effecting an oscillatory motion of said rod.

5. An implement as defined in claim 1 comprising further a frame, said container resting on a portion of said frame, said frame beneath said container defining a slide way, said metering plate being resideable in said slide way and moveable therealong, and resilient means extending over said container and being removably secureable to said frame to hold said container in place on said frame.

6. An implement as defined in claim 1 wherein said bottom wall of said container is sloped towards said opening defined therein.

7. An improved agricultural seeding implement comprising:
   (a) a support means, said support means being adapted for transport by a motive power source;
   (b) a plurality of seed metering units provided on said support means in spaced apart relation, said seed metering units comprising a seed container, said container including a bottom wall that defines an opening therein, a metering plate located beneath said container and defining at least one orifice therin, said orifice being smaller than said opening in said bottom wall and being locatable concentric thereto, said opening and said orifice cooperating to define a dispensing outlet for seed from said container, and seed metering means received in said bottom wall opening and eccentric to said orifice, said metering means being mounted for oscillating motion thereat; and
   (c) drive means associated with all of said metering means for imparting oscillatory motion thereto.

8. A seeding implement as defined in claim 7 comprising further closure means for each metering unit, said closure means being mounted for pivotal movement beneath said container between an orifice closed position and an orifice open position, closure means for said metering units being associated whereby all said metering units can be simultaneously opened or closed.

9. A seeding implement as defined in claim 7 wherein said support means comprises a renovator frame.

10. A seeding implement as defined in claim 7 wherein said seed container is transparent and is removably secured to said support means.

11. A seeding implement as defined in claim 10 wherein said metering means is an elongated rod having a flattened tip portion, said tip portion being received in said container opening.

12. A seeding implement as defined in claim 11 wherein said metering plate defines a plurality of different sized orifices, said plate being movable with respect to said container opening to present an orifice of a predetermined size beneath same.

13. A seeding implement as defined in claim 12 wherein the elongated rod has a diameter of approximately one-half the diameter of the container opening and is located at approximately the center of the radius of the opening, whereby during oscillatory motion an edge of the rod moves through an arc through a centerline of the orifice.

14. A renovator-seeder implement comprising:
   (a) a main frame,
   (b) means received on said frame for connecting said implement to a motive power source;
   (c) a plurality of elongated elements secured to said frame in spaced relation, said elongated elements having means secured to a lower end of same for penetrating the soil during renovation; and
   (d) a plurality of seeder implements secured to said main frame in spaced relation, one said seeder implement being provided adjacent and rearward of each elongated element, said seeder implements comprising a container for seed to be metered onto the ground, said container including a bottom wall which defines an opening therein, metering means located adjacent said bottom wall of said container, said metering means defining at least one orifice therein, said orifice being smaller than said opening in said bottom wall and concentric with respect thereto, said opening in said orifice cooperating to define a dispensing outlet for seed from said container, and positive feed means received in said bottom wall opening and along an axis eccentric to a central axis through said orifice in said metering means, said feed means being adapted for arcuate motion about its axis whereby during said arcuate motion of said feed means, seed are positively metered through said orifice, said positive feed means of said seeder implements being oscillated by a common drive means.

15. A renovator-seeder implement as defined in claim 14 wherein said seeder implement further includes means for directing seed from said orifices onto the ground immediately behind said elongated elements, into furrows produced by said soil penetration means.

16. A renovator-seeder implement as defined in claim 14 wherein said connecting means on said frame is a three point hitch connection.

17. A renovator-seeder implement as defined in claim 12 wherein the elongated rod has a diameter that is approximately one-half the diameter of the opening in the container bottom wall, and is positioned to oscillate with a central axis of same located generally at the center of the radius of the opening, whereby an edge of the rod moves arcuately through a centerline of the metering plate orifice.

18. A renovator-seeder implement as defined in claim 14 wherein said container is cylindrical in nature, said metering means is a plate that defines a plurality of different sized orifices and is moveable with respect to said bottom wall opening to present a predetermined size orifice thereat, and said positive feed means comprises an elongated rod having a flattened tip, said tip residing in said bottom wall opening of said container.

19. A renovator-seeder implement as defined in claim 18 wherein said elongated rod of each seeder implement extends upwardly through the container and is associated with a common drive means which affords simultaneous oscillating motion thereto.

20. A renovator-seeder implement as defined in claim 18 wherein the elongated rod is mounted for vertical adjustment.

* * * * *